(12) United States Patent
Gray et al.

(10) Patent No.: US 6,931,491 B2
(45) Date of Patent: Aug. 16, 2005

(54) HARDWARE-ASSISTED TUPLE SPACE

(75) Inventors: Thomas Gray, Carp (CA); Derrek Wood, Kingston (CA); Charles Rae, Kingston (CA); Aubert Pereira, Kingston (CA)

(73) Assignee: Mitel Knowledge Corporation (CA)

(*) Notice: Subject to any disclaimer, the term of this patent is extended or adjusted under 35 U.S.C. 154(b) by 192 days.

(21) Appl. No.: 10/341,211

(22) Filed: Jan. 13, 2003

(65) Prior Publication Data

US 2003/0135695 A1 Jul. 17, 2003

(30) Foreign Application Priority Data

Jan. 14, 2002 (GB) ............................................. 0200747

(51) Int. Cl.⁷ ............................................. G06F 12/00
(52) U.S. Cl. ..................... 711/128; 707/10; 707/102
(58) Field of Search ............................... 711/105, 128, 711/156, 161, 162; 707/4, 10, 102, 103; 709/201

(56) References Cited

U.S. PATENT DOCUMENTS

| | | | |
|---|---|---|---|
| 5,893,108 A | | 4/1999 | Srinivasan et al. |
| 6,704,734 B2 | * | 3/2004 | Grey et al. .................... 707/10 |
| 2003/0108173 A1 | * | 6/2003 | Gray ...................... 379/201.02 |
| 2003/0133544 A1 | * | 7/2003 | Wasmeier ................ 379/88.22 |
| 2004/0035499 A1 | * | 4/2004 | Turkel et al. .................. 707/5 |

OTHER PUBLICATIONS

"Design and Implementation of a Tuple Space Service for Java", MS Project, CSC 9020, Andrw B. Sudell, Dec. 10, 1998, See HTML version at: http://www.op.net/asudell/is/linda/linda.html.

"St. Lawrence Student Projects to be Patented by Mitel Networks", College Magazine, "St. Lawrence College Voyageur/Fall 2001". See HTML version at: http://www.s-l.on.ca/alumni/voyageur/voy01F05.htm.

* cited by examiner

Primary Examiner—Hiep T. Nguyen
(74) Attorney, Agent, or Firm—Jones Day

(57) ABSTRACT

A hardware-assisted tuple space, comprising a tuple memory for storing tuples of key-value pairs of data; an anti-tuple memory for storing anti-tuples of key-value pairs of data; tuple attribute array memory for storing selected attributes of respective ones of the tuples and anti-tuples; and an input/output and memory control interface for (i) exchanging tuples and anti-tuples between an external process and the tuple and anti-tuple memories, (ii) performing preliminary searches of the tuple attribute array memory to identify possible matching tuples and anti-tuples, and (iii) comparing the key-value pairs of the possible matching tuples and anti-tuples to identify actual matching tuples and anti-tuples.

14 Claims, 1 Drawing Sheet

HARDWARE-ASSISTED TUPLE SPACE

FIELD OF THE INVENTION

This invention relates generally to global associative memory systems, and more particularly to a hardware implementation of a tuple space.

BACKGROUND OF THE INVENTION

Tuple spaces provide a unique form of flexibility in the sharing of information and the coordination of applications. As described in greater detail below, tuples are collections of key-value pairs stored in a tuple space that can be queried based on the matching of anti-tuples by tuples. The original Linda model by David Gelernter (N. Carriero and D. Gelernter, "Linda in context", *Communications of the ACM* 32(4):444–458, Apr. 1989) has found widespread use in collaborative systems. However, tuple spaces have typically been implemented in software, which is inadequate for the scalability and responsiveness of fine-grained and large-scale systems.

The use of custom designed hardware to implement models of fine-grained and large-scaled systems also suffers from a number of disadvantages. Firstly, memory management problems arise since tuples may be of any length and may be inserted and deleted freely in the tuple space, with the result that a fragmented memory structure is created having variable length gaps left where tuples have been removed. This, in turn, creates difficulty in determining where to put new tuples or anti-tuples in the memory.

Secondly, it is difficult to accommodate parallel searching while maintaining reasonable hardware complexity. Also, it is difficult to design specific hardware for the hardware tuple space system so as to scale to very large memory sizes without incurring significant increases in complexity and cost.

The need for hardware assistance to enable improved scalability and responsiveness for a tuple space has been recognized in the World Wide Web Consortium and is reported in the paper *Tuplets: Words for a Tuple Space Machine* by Duncan Campbell. This is a technical report for the Computer Science Department at York and has been designated YCS-97.

Campbell describes the use of a content-addressable memory (CAM) for the implementation of a tuple space. CAMs are accessed by the content of their memory rather than by direct addressing which is advantageous in the case of a tuple search since the memory will return the record associated with the content presented to it which is a natural solution for matching. However, as discussed above, Campbell identifies a major problem that arises in memory management in the case of variable length fields in tuples spaces.

As Campbell correctly points out, since tuples are collections of key-value pairs the number of keys can be restricted so that hashing can be used to produce constant length representations of the keys for the memory. However, in practical applications the values cannot be so restricted. Campbell devises a scheme that he refers to as Tuplets wherein fields (containing both keys and values) can be broken up into fixed length groupings for storage in the memory. This is analogous to the ATM method of segmenting longer length packets into fixed length cells for switching, based on the premise that such segmenting produces more regular and implementable hardware solutions. Tuplets (as with ATM cells) can be reassembled into tuples (packets) when needed.

One difficulty with the Tuplet/Cam solution provided by Campbell is that content searching is complex and requires a very large amount of silicon hardware and real estate to implement. This problem is particularly important in systems that are used for fine-grained control of system operation. Conventional tuple spaces are implemented in software and used for coarse-grained coordination of applications. In such systems, relatively few tuples are used and coordination is relatively infrequent. Such systems are used to communicate between applications (e.g. start one application when another finishes, etc.) However, opportunities now exist for tuple spaces to coordinate the fine-grained behavior of systems wherein applications modify their actions based on current user and network context, the operations of other applications, etc. Such fine-grained behavior control may be applied to systems such as telephone networks, networks of PDAs, etc. A relatively much larger number of tuples are used in such systems and at relatively much faster rates. Hardware solutions are attractive in such applications due to their speed. Although Campbell's tuplet solution meets the speed criteria, it suffers from major deficiencies in terms of cost and in scaling to the relatively larger sizes required by fine-grained applications. Solutions to these problems must scale well with the number of users and be of low cost.

SUMMARY OF THE INVENTION

According to the present invention, conventional low cost RAM is used to implement a tuple space, in conjunction with a content searching method that greatly simplifies and solves the variable length problem identified in the prior art. The method of the present invention searches sequentially through memory such that when implemented with fast RAM and FPGA or ASIC technology and appropriate data structures and search algorithms, the sequential searching becomes very fast. Furthermore, parallel memory banks may be used which can be searched sequentially in parallel to improve speed. In addition, a method is provided for automatically de-fragmenting the memory in a manner that is invisible to the insertion and searching processes.

BRIEF DESCRIPTION OF THE DRAWINGS

A detailed description of the invention is set forth herein below, with reference to the sole drawing, which is a block diagram of a hardware-assisted tuple space according to the preferred embodiment.

DETAILED DESCRIPTION OF THE PREFERRED EMBODIMENT

Figure 1:
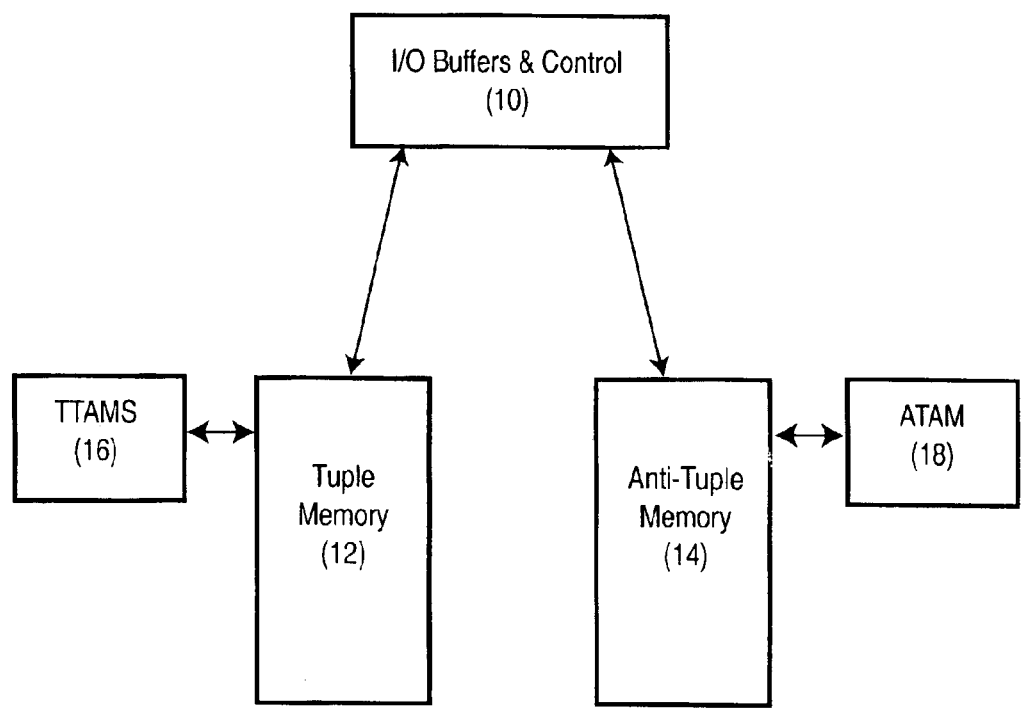

Before discussing the invention is detail, a brief introduction is set forth below to the basic structure and operation of a tuple space.

A tuple space is a set of key/value ordered pairs called ingles or fields. Each ingle consists of a type (e.g. Name) and a value (e.g. John Doe). Thus, a tuple which describes an employee for a company could, for example, be:

{:name John Doe :age 37 :employee_number 12345 :start_date 810126 :position T12}

The tuple space enables coordination by allowing queries based on the matching of tuples by anti-tuples. An anti tuple is a tuple that can be used as a query in the tuple space. In form, it is identical to a tuple except that the value of any or all fields may be replaced by a '?' which indicates a 'don't care' condition. Tuple spaces are set up to match tuples with anti-tuples which agree in all fields except for that one indicated by the ? query. Thus the anti tuple:

{:name ?:age 37 :employee_number ?:start date ?:position T12} would return the tuples for all employees of position T12 who are 37 years old.

Operations on the tuple space consist of:

Poke—place a tuple in the tuple space. Duration may be specified for how long this tuple should remain in the space. This may be any period up to indefinite.

Peek—query the tuple space with an anti-tuple. This query may be specified to last for any period up to indefinite. Copies of matching tuples will be returned through the interface and the tuples remain in the tuple space.

Pick—query the tuple space with an anti-tuple. This query may be specified to last for any period up to indefinite. Copies of matching tuples will be returned through the interface and the tuples are removed from the tuple space.

Cancel—with the specified anti-tuple, remove all matching anti-tuples from the tuple space. Tuples themselves may be removed directly by an appropriate pick request.

Additional operations may be provided such as disclosed in co-pending UK Patent Application No. 0200745.8 filed Jan. 14, 2002 entitled 'Tuple Space Operations for Fine Grained System Control'.

Turning to the block diagram, a hardware-based tuple space is shown according to the present invention. An I/O Buffers and Control block 10 is provided including Input/Output Buffers, Search Logic and Memory Management components. The I/O Buffers link the device to the outside environment. The Search Logic and Memory Management functions perform general memory control for the device and conduct all searches. A tuple memory 12 is provided to store tuples and an anti-tuple memory 14 is provided to store anti-tuples, both of which are implemented using conventional RAM. Parallel RAM may be used to extend the size of the tuple space and can be searched in parallel to increase its search speed for responsivity.

The use of RAM significantly reduces the cost and complexity of the system with respect to the CAM solution of Campbell. In order to address the speed problems associated with using conventional RAM for sequential searching, tuple attributes are stored in an array and are used to provide a mechanism whereby impossible tuple matches (differing numbers of key-value pairs) can be identified without having to search for the tuple in memory. Specifically, tuple attribute array memory (TAM) is provided that contains important attributes of the stored tuples and anti-tuples. Two specific TAMs are provided—the tuple TAM (TTAM 16) for tuple storage and the anti-tuple TAM (ATAM 18) for anti-tuple storage.

The structure of the data in each TAM is as follows:

| | |
|---|---|
| Number of Key-Value Pairs | Number of key-value pairs in the tuple |
| Activated Flag | If set the tuple is activated and can be used in a search process. If not set, the tuple is inactive and will be excluded from any search process. |
| Starting address | Location in memory for the start of the tuple |
| Tuple Length | Length of tuple in words |
| Time Out Value | Absolute system time when tuple is to be automatically cancelled |
| Cancel Flag | Set if the tuple is to cancelled and removed from memory |

The TAM arrays 16 and 18 can be used to speed up the matching process of the tuple space. In particular, each TAM array holds information about the tuple in addition to the starting point in memory. Tuples/anti-tuples will match only if they contain the same number of key value pairs. This information can be obtained easily from the incoming tuple/anti-tuple and matched against the information in the array. Only the tuples in which the numbers of key/value pairs match are considered for further matching by accessing the tuples themselves in memory.

Thus, by having tuples that differ in the number of key-value fields to identify specific classes, only those tuples with the same number of these fields will be compared. By deliberately sizing tuples to differentiate them according to class, enhanced search speed is achieved Additionally, as disclosed in UK Mitel Patent Application No. Mitel #520 entitled 'Tuple Space Operations for Fine Grained Control', tuples and anti-tuples may be activated or deactivated. More specifically, tuples and anti-tuples may be marked so that they will be excluded from the matching process. If the activated flag is set the tuple is included in the matching process. If it is not set then it is excluded from the process. As indicated in the above-mentioned patent application, this can improve system speed and responsivity for applications in which large numbers of tuples or anti-tuples are used for collaboration in different system states. Instead of wasting time, removing and entering tuples and anti-tuples at each change of state, they may be activated or deactivated en masse using techniques described in the above mentioned disclosure.

Tuples and anti-tuples are stored in their respective memories 12 and 14 in contiguous groupings starting at the top of each memory. All lower tuples are moved up to fill in the gaps in the groupings created by cancelled tuples. New tuples are then inserted at the bottom of the memory. When a new tuple of unknown length is obtained, no action needs to be taken to find an appropriately sized space in memory to hold it, in contrast with the prior art hardware-based systems discussed above. Instead, the tuple is placed at the bottom of the memory. This is also in contrast to software-based memory management techniques in which fragmentation is a major and common problem consuming much real time processing.

By tracking a Time Out Value for each tuple, an efficient timer-based garbage collection process is provided to handle the problem of orphan tuples whose owner objects have terminated or erroneously forgotten about them. These tuples can fill the memory, which causes management problems requiring software intervention and periodic re-initiation of the space. According to the present invention the Time Out Values are implemented in hardware. Expired tuples are simply marked as cancelled and then removed from memory automatically by the Memory Management process of block 10, as described in greater detail below.

Tuples are stored in the tuple memory 12 Such that individual keys and values may be determined by the Search Logic of block 10. There are several well-known methods for accomplishing this function, including the use of special delimiting flags, assignment on fixed relative memory locations such as word boundaries, etc. The details of how tuples are determined are not important to the present invention. A particular implementation is set forth below.

Operation of the present invention is set forth below with reference to a typical Pick operation. The operations for Poke, Peek and Cancel are similar and would be obvious to a person skilled in the art upon reading this specification.

With the Peek operation, an anti-tuple is received from an external process and placed in the Input/Output buffers of block 10. The attributes described above for the incoming anti-tuple are then extracted and matched in turn by the Search Logic of block 10 against the attributes of the tuples stored in TTAM 16. Initially the state of the ACTIVATE flag is checked. If for a particular tuple it is not set, the tuple is deactivated and is not to be used for matching as described above. In this case the search moves to the next tuple. If for this next tuple the ACTIVATE flag is set, the tuple is to be used for matching, etc. Next, the Number of Key-Value Pairs attributes of the anti-tuple and selected tuple are compared. If these do not match then there is no possibility of a tuple match and the search moves to the next tuple in turn. It will be seen that matching attributes results in a quick search that increases the overall speed of the search by excluding impossible matches.

The ordering of these checks is not important and may be reversed in implementation. Analysis of specific applications may reveal that more time in searching may be saved in searching by one ordering sequence or another. This ordering is therefore application specific and may be optionally selected by the user with logic in the device if needed.

If the preliminary match succeeds, the Search Logic executes a conventional sequential search wherein keys and values for the tuple are extracted in turn from the tuple memory 12 and matched against the corresponding locations in the received anti-tuple. This matching begins at the location in memory indicated by the TTAM starting address attribute for the tuple. The search continues location-by-location until either the end of the tuple is reached, which indicates that a match has been found, or the first mismatch is found. If a mismatch is found then the Search Logic examines the next tuple. Since this is a Pick operation, if a match is found a copy of the tuple is moved to the I/O Buffers and the Cancel flag is set in the TTAM location for the matched tuple. The tuple value in I/O is used at the end of the process to return the matched tuple to the requesting process. The set Cancel flag indicates to the Search Logic that the tuple is to be removed from memory (described in detail below with reference to the memory management section). The search continues tuple-by-tuple until all of the tuple attributes in TTAM 16 have been checked.

At the end of the process the attributes of the received anti-tuple are placed at the bottom of the ATAM memory 18 and the anti-tuple itself is placed at the bottom of the anti-tuple memory 14. The memory management process is then applied to the contents of the tuple memory and the ATAM memory, as described in greater detail below.

The algorithms set forth above can be used in parallel across more than one copy of the memory elements in the block diagram. In such as case, the TAM, ATAM tuple memory and anti-tuple memory elements are replicated as needed and the I/O element is modified to accommodate returned tuples from all of the memory blocks and to select the most suitable memory block to store the incoming tuple or anti-tuple.

The Memory Management process of block 10 performs a search and a nested memory move operation for "garbage collection" of cancelled tuples. The process begins in the appropriate TAM memory. Following the example of a PICK operation as described above, since the TTAM 16 was used there is a possibility that some tuples have been cancelled (i.e. the tuples that match the received anti-tuple and are therefore "picked" from the tuple memory). The process searches attributes starting from the top of the TTAM 16. If a cancelled tuple is located (i.e. the Cancel Flag has been set), the starting address of the cancelled tuple is stored along with the starting address of the tuple immediately below it thereby defining a memory address offset. The contents of the tuple memory 12 are then moved upward byte-by-byte according to the indicated offset. This move operation continues until the last (i.e. bottom-most) tuple of the tuple memory 12 has been moved upwardly. This effectively cancels the "picked" tuple and creates additional space at the bottom of the tuple memory 12. Next, the data in the TTAM 16 is moved up one location to remove the attribute for the cancelled tuple.

The process is then re-initiated at the beginning of the memory 12 and continues searching for and removing cancelled tuples until it reaches the bottom of the TTAM 16. This recursive process makes the development of the hardware algorithm particularly simple. However, a skilled person will appreciate that other algorithms may be used.

Variations and modifications of the invention are contemplated. For example, the memory management process may be performed only when no anti-tuple or tuple search operations are pending, rather than starting at the end of a particular tuple or anti-tuple search operation. This alternative results in the benefit of increased the speed of the system since no time is wasted cleaning up the memories when search requests are pending, which is particularly advantageous in systems wherein the requests are bursty (e.g. telephony and other systems which operate in reaction to human intervention). In this alternative, during the searching process the Cancel flag is examined in addition to the Number of Key-Value Pairs attributes. If the Cancel Flag is set, the search process does not need to examine the tuple for a possible match.

This and all other such alternative embodiments are believed to fall within the sphere and scope of the invention as defined by the appended claims.

What is claimed is:

1. A hardware-assisted tuple space, comprising:
   a tuple memory for storing tuples of key-value pairs of data;
   an anti-tuple memory for storing anti-tuples of key-value pairs of data;
   tuple attribute array memory for storing selected attributes of respective ones of said tuples and anti-tuples; and
   an input/output and memory control interface for (i) exchanging tuples and anti-tuples between an external process and said tuple and anti-tuple memories, (ii) performing preliminary searches of said tuple attribute array memory to identify possible matching tuples and anti-tuples, and (iii) comparing said key-value pairs of said possible matching tuples and anti-tuples to identify actual matching tuples and anti-tuples.

2. The hardware-assisted tuple space of claim 1, wherein said tuple memory and said anti-tuple memory are implemented using RAM.

3. The hardware-assisted tuple space of claim 2, wherein at least one of said selected attributes indicates the number of said key-values pairs of each of said tuples and anti-tuples.

4. The hardware-assisted tuple space of claim 2, wherein at least one of said selected attributes is a flag which indicates whether said respective ones of said tuples and anti-tuples are activated for inclusion in said preliminary searches or deactivated for exclusion from said preliminary searches.

5. The hardware-assisted tuple space of claim 2, wherein at least one of said selected attributes indicates the starting addresses in said tuple memory and anti-tuple memory for each of said tuples and anti-tuples, respectively.

6. The hardware-assisted tuple space of claim 2, wherein at least one of said selected attributes provides the length of each of said tuples and anti-tuple in words.

7. The hardware-assisted tuple space of claim 2, wherein at least one of said selected attributes indicates an absolute system time at which each of said tuples and anti-tuple is to be cancelled.

8. The hardware-assisted tuple space of claim 2, wherein at least one of said selected attributes is a flag which indicates whether said respective ones of said tuples and anti-tuples is to be cancelled and removed from memory.

9. The hardware-assisted tuple space of claim 1, wherein said tuple attribute array memory comprises a first array memory for storing attributes of said tuples in said tuple memory and a second array memory for storing attributes of said anti-tuples in said anti-tuple memory.

10. A method of operating a tuple space implemented in memory, comprising:
   storing tuples of key-value pairs of data;
   storing anti-tuples of key-value pairs of data;
   storing selected attributes of respective ones of said tuples and anti-tuples;
   performing preliminary searches of said selected attributes to identify possible matching tuples and anti-tuples; and
   comparing said key-value pairs of said possible matching tuples and anti-tuples to identify actual matching tuples and anti-tuples.

11. The method of claim 10, wherein at least one of said selected attributes indicates the number of said key-values pairs of each of said tuples and anti-tuples, and wherein said preliminary searches include comparing said number of said key-values pairs of each of said tuples and anti-tuples to identify said possible matching tuples and anti-tuples.

12. The method of claim 10, wherein at least one of said selected attributes indicates the starting addresses in said memory for comparing said key-value pairs of said possible matching tuples and anti-tuples, respectively.

13. The method of claim 10, wherein at least one of said selected attributes provides the length of each of said tuples and anti-tuple in words, and wherein said preliminary searches include comparing said length of each of said tuples and anti-tuples to identify said possible matching tuples and anti-tuples.

14. The method of claim 10, wherein at least one of said selected attributes is a flag which indicates whether a respective one of said tuples or anti-tuples is to be cancelled and removed from said memory and at least one further selected attribute indicates a starting address in said memory for said respective tuple or anti-tuple, and wherein said method further comprises searching said attributes for said flag and in response to locating said flag moving successive ones of said tuples and anti-tuples upward in said memory beginning immediately below said starting address, thereby removing said respective one of said tuples or anti-tuples.

* * * * *